United States Patent

[11] 3,588,620

[72] Inventor Norbert J. Wasileski
Farmington, Conn.
[21] Appl. No. 847,892
[22] Filed Aug. 6, 1969
[45] Patented June 28, 1971
[73] Assignee General Electric Company

[54] ELECTRICAL CONTROL DEVICE PANEL ASSEMBLY WITH MULTIFUNCTIONAL INSULATING SUPPORT MEANS
4 Claims, 5 Drawing Figs.

[52] U.S. Cl. .................................................. 317/119, 174/72B, 174/99B
[51] Int. Cl. ........................................ H02b 1/20, H02b 1/04
[50] Field of Search .......................................... 317/119; 174/70 (B), 71 (B), 72 (B), 68 (B), 99 (B)

[56] References Cited
UNITED STATES PATENTS

| | | | |
|---|---|---|---|
| 2,738,445 | 3/1956 | Hammerly | 317/119 |
| 3,075,039 | 1/1963 | Kobryner | 174/99B |
| 3,219,887 | 11/1965 | Gerg | 174/99B |
| 3,309,580 | 3/1967 | Jacobs | 317/119 |
| 3,375,411 | 3/1968 | Mrowka | 317/119 |
| 3,463,967 | 8/1969 | Klein | 317/119 |

Primary Examiner—Lewis H. Myers
Assistant Examiner—Gerald P. Tolin
Attorneys—Robert T. Casey, Robert S. Smith, D. M. Schiller, Frank L. Neuhauser, Oscar B. Waddell and Joseph B. Forman ABSTRACT: An electrical control device panel interior assembly comprising an elongated support of relatively thin insulating material supporting three parallel elongated bus bars at the back thereof, a row of connector means centrally at the front of the support, and cross straps extending from the outer bars to the central connectors through openings in the support and means for supporting a plurality of electrical control devices on the support in connected relation to the connectors.

INVENTOR
NORBERT J. WASILESKI
BY Robert A. Smith
ATTORNEY

INVENTOR
NORBERT J. WASILESKI

BY Robert S. Smith
ATTORNEY 3,588,620

ELECTRICAL CONTROL DEVICE PANEL ASSEMBLY WITH MULTIFUNCTIONAL INSULATING SUPPORT MEANS

BACKGROUND OF THE INVENTION

1. Field of the Invention

This invention relates to electrical control device panel assemblies including panelboard or load center assemblies and, more particularly, to the interior construction thereof required to support and insulate the bus bars and support a plurality of circuit breakers.

2. Description of the Prior Art

In accordance with the prior art, a basic boxlike housing is provided to enclose a plurality of bus bars and circuit breakers.

A generally channel-shaped upwardly facing elongated supporting pan of metallic material is mounted in the box. The pan has outwardly extending flanges along each side. Within the pan, two or three elongated bus bars are supported and insulated from each other by insulating means. The support and insulating means may be modular molded insulating blocks, or thin insulating sheet material, or a combination thereof. Most commonly, in panel assemblies of the type referred to in use commercially at the time of the present invention, the ends of the bus bars are supported by molded insulating blocks, and the intermediate portions are supported and insulated from each other and from the supporting pan by either modular insulating blocks or by insulating sheet material.

A row of connecting terminals are positioned in a lengthwise row centrally of the pan, and each succeeding terminal is connected to a different bus bar. This requires branch connecting straps or cross straps connecting some of the terminals to the outer two bus bars. The electric control devices, such as circuit breakers, are mounted by having one end supported on one of the flanges of the supporting pan and by having the other end engaging one of the central terminals. Structures of the type described are shown, for example, in U.S. Pat. No. 2,790,113 Brown, Apr. 23, 1957 and in U.S. Pat. No. 3,375,411 Mrowka, Mar. 26, 1968, as well as in a number of other patents. In an earlier commercial version, shown in U.S. Pat. No. 2,738,445, Hammerly, et al., Mar. 13, 1956, the bus bars were supported in the pan by an insulating block at one end and by having the remaining portions embedded in a body of elastomeric insulating material.

All of the above-described assemblies require the fabrication of a metallic supporting pan, the provision of breaker-engaging support means such as hooks on the pan flanges, at least one separate insulating support for the line ends of the bus bars, and additional means separate form the foregoing to insulate intermediate portions of the bus bars and cross straps from each other and, in larger sizes, to support the intermediate bus bar portions. Barrier means are also required to insulate adjacent terminals from each other.

The fabrication or molding and assembly of these parts is expensive and time consuming.

Also, in many of such prior art panel assemblies at least some of the main bus bars were exposed to the front of the panel. This is undesirable, since a person installing or changing control devices might make accidental contact with such bus bars such as by a screwdriver slipping, etc., with a possible short circuit blowup occuring This application discloses and claims bus bars arranged in compact, closely spaced relation and embedded in a resilient molded insulating body made of vinyl resin composition with line terminals projecting from one end of the body and with contact blades projecting from spaced points along the length of the body and mechanically and electrically connected to intermediate points to the bus bars for the attachment of circuit breakers or other control devices. The molded unitary bus bar assembly is flat and rectangular in shape and is supported in a pan or tray by means of clamps engaging the molded body so that the molded body forms a support for the bus bars throughout their length while having sufficient resiliency to provide for expansion and contraction of of the relatively rigid bus bars without damage to the molded body. Despite the relative simplicity of this construction, it is not as simple and convenient to manufacture as the present invention.

OBJECTS OF THE INVENTION

Accordingly, an object of the present invention is to provide a simple, compact, reliable, and inexpensive panelboard subassembly convenient for installation in a panel box or cabinet which is a rugged unitary assembly of panelboard bus bars and terminals which can be handled, stored, or shipped as a separate item and which does not require a supporting pan for the control device (circuit breakers) and separate insulating means for the bus bars.

Another object of this invention is to provide insulating means for closely spaced panelboard conductors which also serves as support means for the conductors and the circuit breakers, thereby simplifying assembly procedures and lowering manufacturing costs.

It is a further object of this invention to provide unitary insulating means for panelboard conductors which will resiliently support and enclose conductors in spaced relation throughout their lengths so as to minimize the possibility of distortion of the conductors whether due to magnetic forces, such as created by currents of short circuit magnitude, or by pressure applied by operator or installer.

SUMMARY OF THE INVENTION

In accordance with the present invention, there is provided an elongated, resilient, channeled support of insulating material which is secured to a panelboard or a load center housing. Closely spaced bus bars are secured to the channeled support in parallel substantially coplanar relation. Slots are provided along two sides of the support to accommodate mounting hooks carried by circuit breakers. Apertures are linearly positioned for access to branch straps from each of two conductors and direct access to the third conductor in an embodiment suitable for use with three-phase electrical power. In an embodiment suitable for use with single-phase electrical power, one conductor and its branch straps are eliminated.

The novel features which are believed to be characteristic of the invention are set forth particularly in the appended claims. The invention itself, however, both as to its organization and method of operation may be best understood by reference to the following description taken in conjunction with the accompanying drawing.

DESCRIPTION OF A PREFERRED EMBODIMENT

Figure 1:
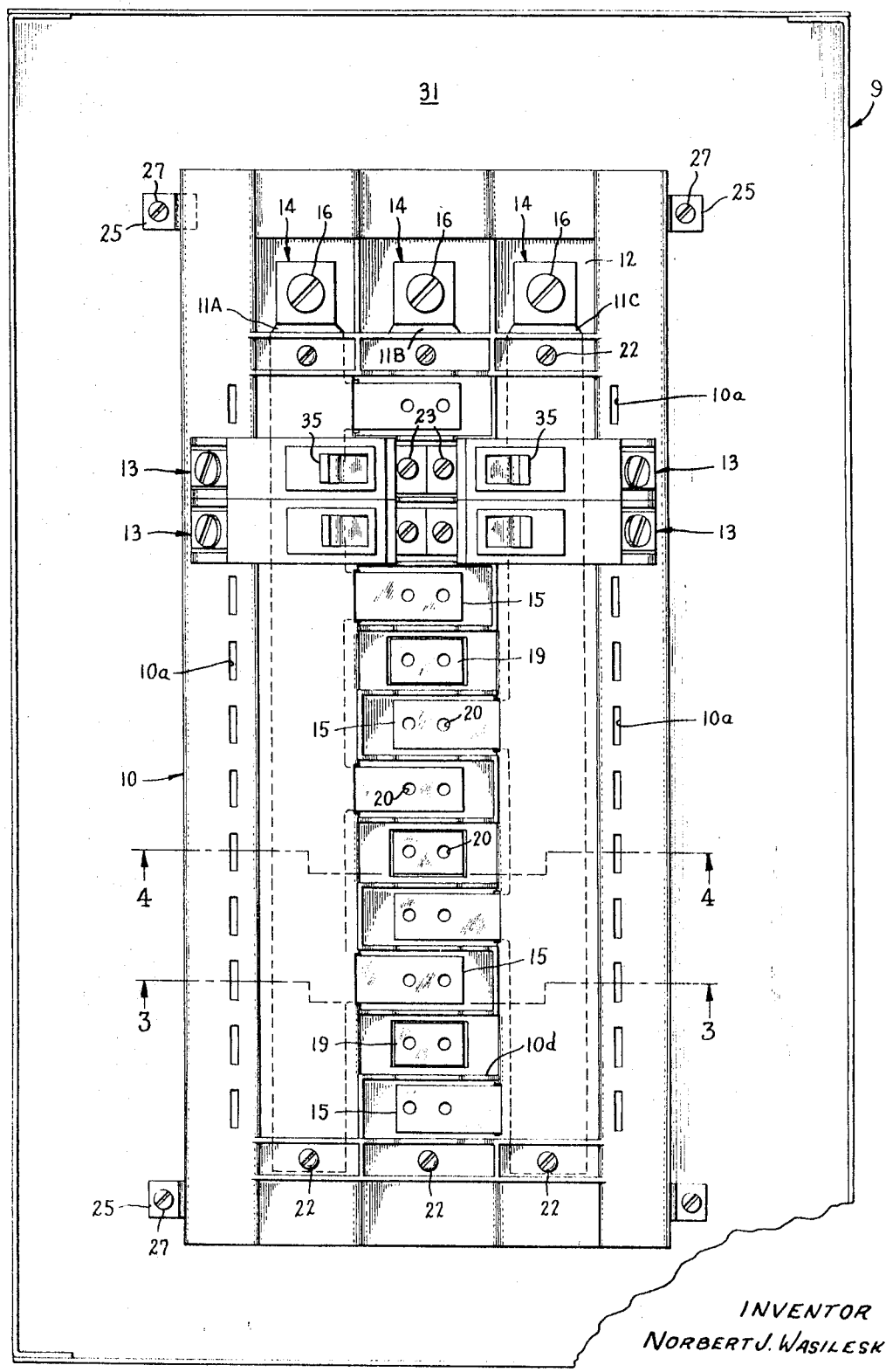
FIG. 1 is a top-plan view showing a panelboard or load center in accordance with the invention.
Figure 2:
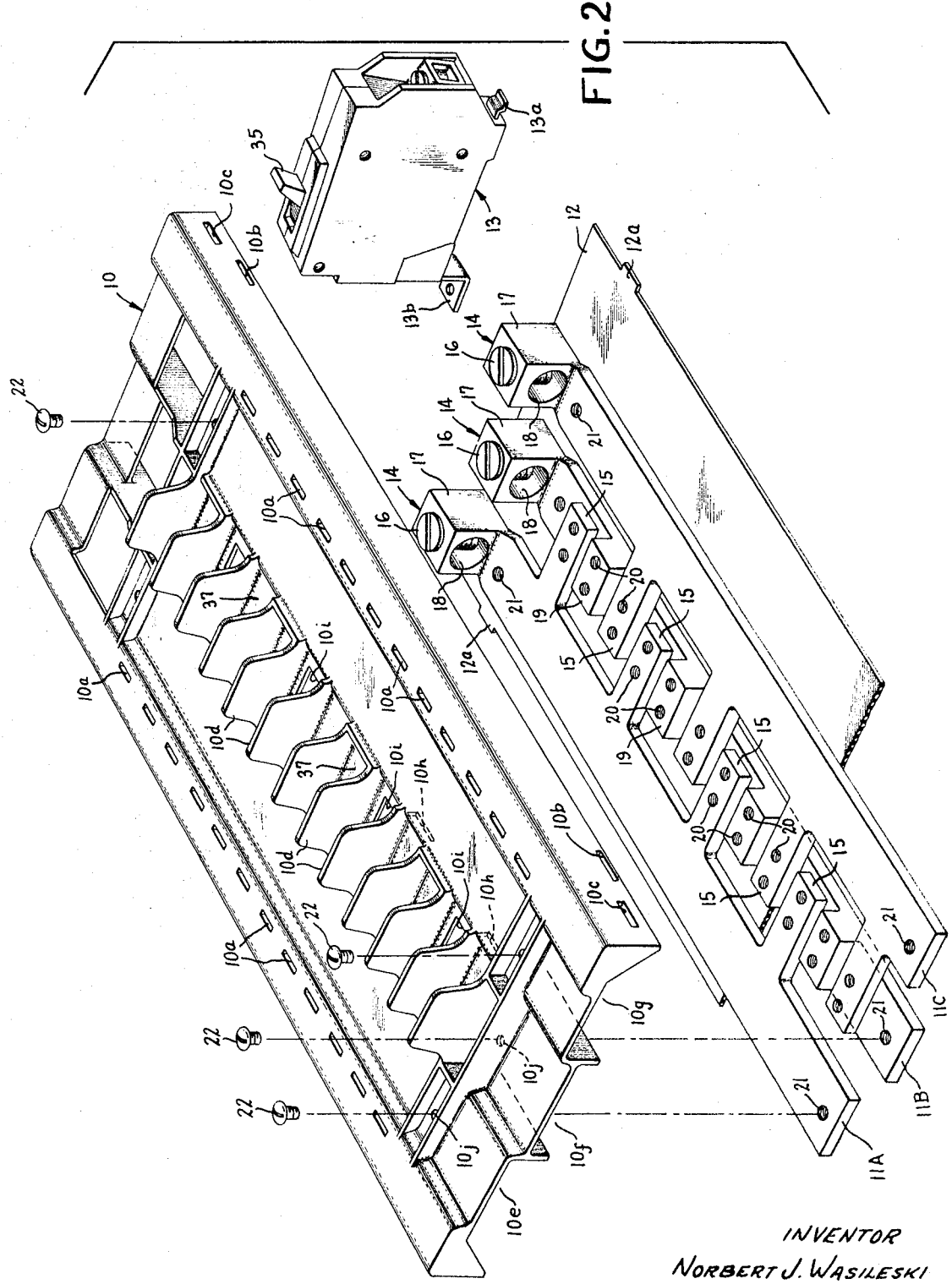
FIG. 2 is an exploded perspective view showing the panelboard load center channeled insulating sheet, bus bars, backing sheet, and an electric control device, in this case a circuit breaker, in greater detail.

Referring now to FIGS. 1 and 2, the invention is shown as incorporated in a panelboard or load center 9 including an interior assembly comprising a channeled insulating support 10; a set of bus bars 11A, 11B, 11C; and an insulating or backing sheet 12. A circuit breaker 13 is shown to further illustrate the manner in which the invention is utilized. The channeled insulating support 10 is best manufactured by molding techniques from reinforced glass polyester, fiber glass, or polypropylene.

The material selected must have excellent electrical insulating properties for the purpose of electrically insulating the closely spaced bus bars 11A, 11B, and 11C as well as branch straps 15 which are closely spaced with respect to the central bus bar 11B. The material must also have "nontracking" properties, i.e., an arc along the surface of the material should not oxidize the material to create a continuous carbonized path of low electrical resistance. Because of temperature changes, it, furthermore, must be resilient and flexible to provide for expansion and contraction of the rigid bus bars with the resultant movement of the lugs and branch straps. It must also be tough, nonabsorbent of moisture, noninflammable, must not deteriorate greatly with age even at elevated temperatures either in sunlight or in humid atmospheres, and must be capable of resisting elevated temperatures, such as 85° C., for indefinite periods.

The channeled insulating support 10 is provided with a plurality of slots 10a for retention of the circuit breakers 13 by means of spring tabs or hooks 13a. Four slots 10b are provided near the extremities of the elongated channeled insulating support 10 to provide mounting for the backing sheet 12 which is slightly smaller in width than the inside width of channeled insulating sheet 10. Tabs 12a are provided on backing sheet 12 to engage the slots 10b. Also adjacent the corner extremities of channeled insulating support 10, four slots 10c are provided for clamping brackets 25 which are omitted in FIG. 2 for simplicity. The brackets 25 retain the entire assembly of bus bars 11, channeled insulating support 10, and insulating sheet 12 in the housing of the load center or panelboard. The channeled insulating support 10 is also provided with a plurality of upstanding, elongated, parallel dividers 10d which separate adjacent circuit breakers 13 and reduce the probability of accidental bridging of a conductive member between bus bar portions of different electrical potential. The channeled insulating supporting 10 is also provided with three channeled portions 10e, 10f, and 10g which carry and support bus bars 11A, 11B, and 11C.

The bus bars 11A and 11C are each provided with an integral lug portion 14 and a plurality of integral branch strap portions 15. The lug portions indicated generally as 14 comprise a machine screw 16 carried by a body portion 17 having suitable threaded surfaces to engage screw 16. The body portion 17 is provided with an aperture 18 which, together with the other portions of the lug, provide for connection of wire or cable conductors to the bus bars 11. The branch straps 15, which conventionally are separate pieces, are preferably made as an integral portion of the bus bars 11A and 11C. The central bus bar 11B is provided with a lug portion 14 as are the bus bars 11A and 11C but instead of branch strap portions 15, it is provided with a plurality of bosses 19. Each of the circuit breakers 13 is attached to one of the branch straps 15 or bosses 19 by means of a machine screw or bolt 23 passing through tab 13b of a single circuit breaker 13 and into suitable threaded hole 20 provided in either the branch strap 15 or the boss 19. Alternatively, however, the connection to the branch straps 15 and the bosses 19 could be made by means of clamp-on devices, threaded holes 21 are provided in the bus bars 11, adjacent the ends thereof respectively, for retention of the bus bars to the elongated channeled support 10 by means of machine screws 22 passing through holes 10j. The backing sheet 12, when assembled into channel insulating support 10 as heretofore described, protects the bus bars 11 from contacting the panelboard or load center housing or cabinet.

Figure 3:
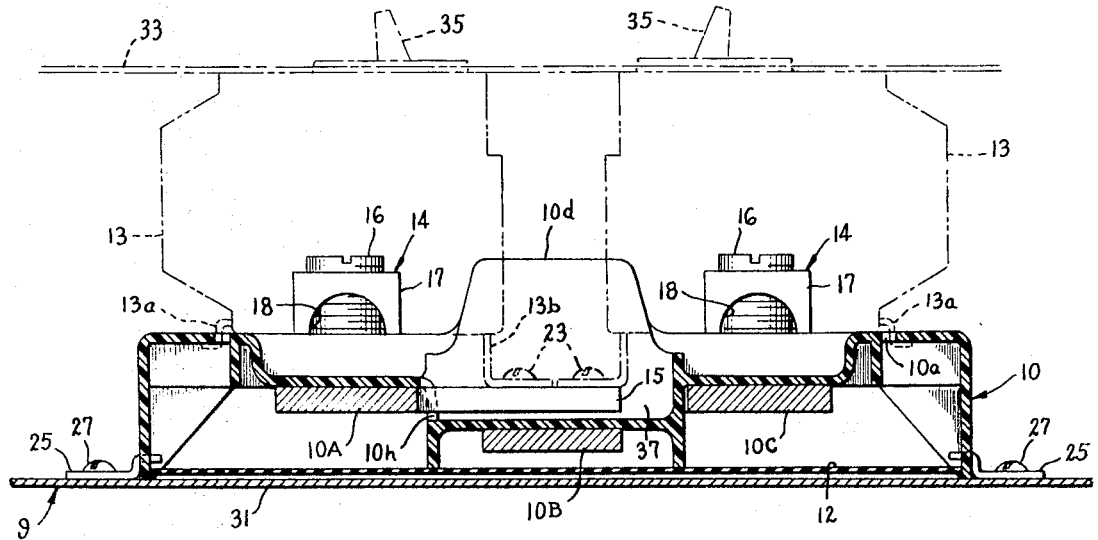
FIG. 3 is a sectional view of the panelboard structure shown in FIG. 1 taken along the line 3–3 of FIG. 1.

As illustrated in FIG. 3, the three bus bars 11A, 11B, and 11C are nested in channels at the underside of the insulating support 10. The channeled support 10 is provided with a slot 10h to allow passage of each branch strap portion 15 of bus bar 11A into the central area where connection may be made to tab 13b of a circuit breaker 13 by means of a machine screw 23. The holddown clamps 25 described above are shown secured by a plurality of screws 27 to the rear portion 31 of panelboard or load center housing 9. The front surface 33 of the panelboard or load center housing 9 is provided with suitable apertures not shown in this section for an operating handle 35 of each circuit breaker 13. In a similar manner, an aperture is provided in channeled support 10 for the passage of each branch strap 15 from bus bar 11A into the central area 37 for connection to another circuit breaker 13.

Figure 4:
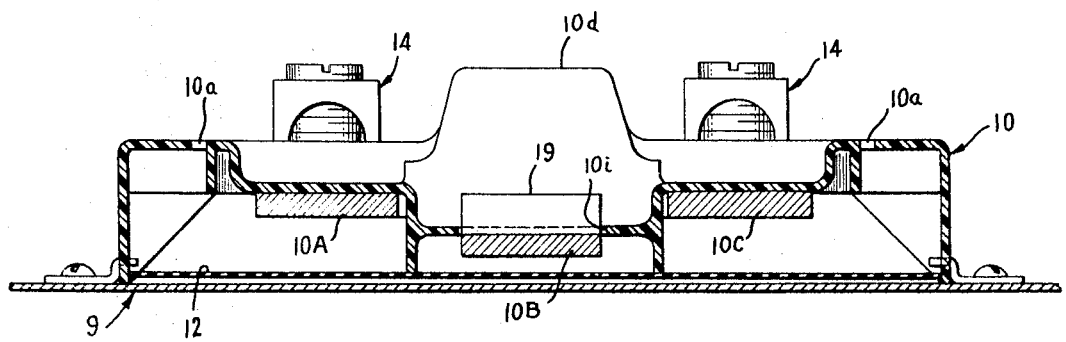
FIG. 4 is a sectional view of the panelboard structure shown in FIG. 1 taken along the line 4–4 of FIG. 1.
Figure 5:
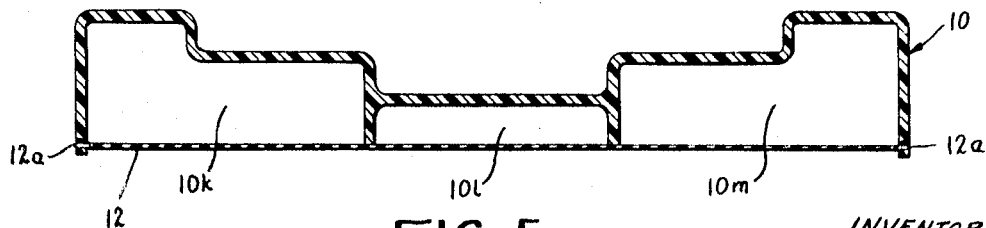
FIG. 5 is a sectional view of the panelboard structure shown in FIG. 1 with dividers and bus bars omitted.

As illustrated in FIG. 4, an aperture 10i is provided in the channeled sheet 10 over each boss 19 of the central bus bar 11B whereby suitable connection may be made by tab 13b of a circuit breaker 13 as heretofore described. Referring now to FIG. 5, a section of the channeled insulating sheet 10 through an end portion where no bus bars are located is shown to clearly indicate the three bus bar isolation chambers 10k, 10l, and 10m defined by channeled insulating support 10 and backing sheet 12.

In order to provide a "single-phase" load center, one of the bus bars 11A, 11B, and 11C may be omitted, the branch strap portions, bosses, and apertures in the channeled insulating sheet 10 being suitably modified to provide alternating connections to the two bars. It will further be understood that whereas I have disclosed a circuit breaker of the manually operated type provided with switch contacts which are also separated automatically to open the circuit in response to a predetermined current, the term "circuit breaker" is defined to include other types of control units or circuit interrupters, such as switches, fuses, and combinations of switches and fuses.

Because different embodiments of the invention may be made without departing from the spirit and scope of the invention, it is intended that all matter contained in the foregoing description or shown in the accompanying drawing should be interpreted as illustrated and not in a limiting sense.

I claim:

1. In an electrical control device panel assembly the combination comprising:
   a. unitary elongated support of relatively thin insulating material, said support having a generally planar main portion with backwardly extending side portions, said support also having a pair of backwardly extending barrier portions extending parallel to said side portions and defining with said side portions three elongated channels at the back of said support;
   b. a plurality of elongated bus bars carried by said support, there being at least one such bus bar in each of at least two of said channels;
   c. a plurality of electrical connecting terminals carried by said support and disposed in a row extending parallel to said bus bars and centrally of said support and accessible for connection from the front of said support;
   d. means connecting each of said terminals to one of said bus bars;
   e. a plurality of barrier members integral with said support, each of said barrier members being positioned between an adjacent pair of said terminals;
   f. a plurality of control device mounting means carried by said support, each of said mounting means being positioned adjacent an outer edge of said support and opposite one of said terminals;
   g. said support having openings in said main portion affording access to one end of each of said bus bars for connection of incoming power conductors thereto.

2. In an electrical control device panel assembly, the combination as set forth in claim 1, said combination also including a sheet of insulating material extending across the back of said support and closing all of said three channels.

3. In an electrical control device panel assembly, the combination as described in claim 1, the central longitudinal portion of said main portion of said support being depressed toward the back of said support to form a central longitudinal channel opening to the front of said support and having sidewalls separating said front-opening channel from the outer two of said three channels at the back of said support; said terminals being located in said front-opening channel; said sidewalls of said front-opening channel having openings therein; said connecting means connecting said bus bars comprising a plurality of cross straps each extending through one of said openings and connecting one of said terminals to one of said bus bars in one of said outer two channels at the back of said support.

4. In an electrical control device panel assembly, the combination as set forth in claim 3, said cross straps connecting said outer two of said bus bars to said terminals in said central front-opening channels being elongated flat planar conductors.